United States Patent
Ando

(10) Patent No.: US 12,054,885 B2
(45) Date of Patent: Aug. 6, 2024

(54) ELASTOMER REINFORCEMENT CORD

(71) Applicant: BRIDGESTONE CORPORATION, Tokyo (JP)

(72) Inventor: Nobuhiro Ando, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 120 days.

(21) Appl. No.: 17/283,593

(22) PCT Filed: Oct. 29, 2019

(86) PCT No.: PCT/JP2019/042418
§ 371 (c)(1),
(2) Date: Apr. 8, 2021

(87) PCT Pub. No.: WO2020/090833
PCT Pub. Date: May 7, 2020

(65) Prior Publication Data
US 2021/0379931 A1    Dec. 9, 2021

(30) Foreign Application Priority Data
Oct. 30, 2018    (JP) ................. 2018-204360

(51) Int. Cl.
*D07B 1/16*    (2006.01)
*B60C 9/00*    (2006.01)
(Continued)

(52) U.S. Cl.
CPC ............ *D07B 1/167* (2013.01); *B60C 9/0007* (2013.01); *B60C 9/005* (2013.01); *D02G 3/48* (2013.01);
(Continued)

(58) Field of Classification Search
CPC ........ B60C 9/0007; B60C 9/005; D02G 3/48; D07B 1/0613; D07B 1/0626; D07B 1/167
See application file for complete search history.

(56) References Cited

U.S. PATENT DOCUMENTS 7,228,681 B2 * 6/2007 Meersschaut ......... B60C 9/0007
57/213
2002/0053386 A1 * 5/2002 Hirachi ................. B60C 9/0007
152/451

(Continued)

FOREIGN PATENT DOCUMENTS

| EP | 3 875 676 A1 | 9/2021 |
| EP | 3 875 678 A1 | 9/2021 |

(Continued)

OTHER PUBLICATIONS

"Overview of materials for Styrene/Butadiene/Styrene (SBS)", https://www.matweb.com/search/DataSheet.aspx?MatGUID=cdfd0eafc8c2453b8eb1ee3173ac2745, retrieved Apr. 20, 2023 (Year: 2023).*

(Continued)

*Primary Examiner* — Shaun R Hurley
(74) *Attorney, Agent, or Firm* — Sughrue Mion, PLLC

(57) ABSTRACT

Provided is an elastomer reinforcement cord with improved rust resistance. An elastomer reinforcement cord 10 includes metal filaments and a polymer material. The elastomer reinforcement cord 10 has a multi-strand structure which includes: at least one core strand 21 formed by twisting plural metal filaments 1a and 1b together; and two or more sheath strands 22 each formed by twisting plural metal filaments 11a and 11b together, the sheath strands being twisted together around the core strand. An intra-sheath-strand filling rate a, which is a ratio of the area of the polymer material with respect to an intra-sheath-strand gap region A, is 52% or higher, and an inter-strand filling rate b, (Continued)

which is a ratio of the area of the polymer material with respect to an inter-strand gap region B, is 75% or higher.

15 Claims, 2 Drawing Sheets

(51) Int. Cl.
    *D02G 3/48*     (2006.01)
    *D07B 1/06*     (2006.01)
    *B60C 9/20*     (2006.01)

(52) U.S. Cl.
    CPC ......... *D07B 1/0613* (2013.01); *D07B 1/0626* (2013.01); *B60C 2009/0092* (2013.01); *B60C 2009/2061* (2013.01); *B60C 2009/2096* (2013.01); *D07B 2201/2023* (2013.01); *D07B 2201/2036* (2013.01); *D07B 2201/2041* (2013.01); *D07B 2201/2066* (2013.01); *D07B 2201/2082* (2013.01); *D07B 2205/2017* (2013.01); *D07B 2205/3025* (2013.01); *D07B 2401/2025* (2013.01); *D07B 2401/204* (2013.01); *D07B 2501/2046* (2013.01)

(56) References Cited

U.S. PATENT DOCUMENTS

| | | |
|---|---|---|
| 2010/0170215 A1 | 7/2010 | Nishimura |
| 2010/0257834 A1 | 10/2010 | Baekelandt et al. |
| 2011/0198008 A1 | 8/2011 | Pottier et al. |
| 2011/0253280 A1* | 10/2011 | Matsuo ................ B60C 9/0007 152/526 |
| 2012/0055602 A1 | 3/2012 | Nishimura |
| 2012/0174557 A1 | 7/2012 | Boisseau et al. |
| 2013/0032264 A1 | 2/2013 | Cheng et al. |
| 2017/0114496 A1 | 4/2017 | Belin et al. |
| 2019/0329593 A1 | 10/2019 | Shizuku et al. |
| 2021/0394560 A1 | 12/2021 | Shizuku |
| 2021/0395947 A1 | 12/2021 | Shizuku |

FOREIGN PATENT DOCUMENTS

| | | |
|---|---|---|
| FR | 3 014 914 A1 | 6/2015 |
| JP | 47-040188 Y | 12/1972 |
| JP | 60-231884 A | 11/1985 |
| JP | 06-122162 A | 5/1994 |
| JP | 2001-234444 A | 8/2001 |
| JP | 2007-314010 A | 12/2007 |
| JP | 2009-52177 A | 3/2009 |
| JP | 2010-248670 A | 11/2010 |
| JP | 2012-531540 A | 12/2012 |
| JP | 2015-203157 A | 11/2015 |
| WO | 2011/116493 A1 | 9/2011 |
| WO | 2017/222046 A1 | 12/2017 |

OTHER PUBLICATIONS

Extended European Search Report dated Jul. 28, 2022 in European Application No. 19879404.2.

International Search Report for PCT/JP2019/042418 dated Jan. 28, 2020 [PCT/ISA/210].

"Steel cord constructions made in one step", Research Disclosure, Kenneth Mason Publications, Jul. 1, 1991, vol. 327, No. 118, XP007116666 (12 pages total).

* cited by examiner

ELASTOMER REINFORCEMENT CORD

CROSS REFERENCE TO RELATED APPLICATIONS

This application is a National Stage of International Application No. PCT/JP2019/042418 filed Oct. 29, 2019, claiming priority based on Japanese Patent Application No. 2018-204360 filed Oct. 30, 2018.

TECHNICAL FIELD

The present invention relates to an elastomer reinforcement cord (hereinafter, also simply referred to as "cord"). More particularly, the present invention relates to an elastomer reinforcement cord having a multi-strand structure which exhibits excellent adhesion with an elastomer.

BACKGROUND ART

Conventionally, steel cords obtained by twisting plural steel filaments together are used as reinforcing materials in belt cords and the like of a tire. However, in such steel cords, for example, when the tire is subjected to an external injury and damage reaching the steel cords occurs, water and the like in the external environment may permeate into the gaps between the filaments constituting the steel cords and rust the steel cords. Accordingly, gaps are formed inside the steel cords to allow rubber to permeate into the steel cords at the time of vulcanization, whereby the water pathway is sealed.

For example, Patent Document 1 proposes a composite cord obtained by twisting sheath wires each composed of 2 to 12 steel filaments around a core composed of resin filaments having a melting point of 50° C. to lower than 200° C. In this composite cord, rusting of the steel filaments is inhibited by melting the resin filaments at the time of vulcanization to form appropriate gaps between the steel filaments and allowing rubber to permeate into the thus formed gaps.

RELATED ART DOCUMENT

Patent Document

[Patent Document 1] JP2001-234444A

SUMMARY OF THE INVENTION

Problems to be Solved by the Invention

As in Patent Document 1, it is known to inhibit rusting of a cord composed of metal filaments by using resin filaments in combination. However, in Patent Document 1, a multi-strand cord having a complex structure that includes a greater number of metal filaments was not examined, and a technology for further improvement of the rust resistance has been demanded for multi-strand cords as well.

In view of the above, an object of the present invention is to provide an elastomer reinforcement cord which has a multi-strand structure including plural metal filaments and exhibits an improved rust resistance.

Means for Solving the Problems

The present inventor intensively studied to discover that the above-described problems can be solved by defining a polymer material originated from resin filaments to have a prescribed filling rate inside a cord that has a multi-strand structure including metal filaments, thereby completing the present invention.

That is, the elastomer reinforcement cord of the present invention is an elastomer reinforcement cord including metal filaments and a polymer material, wherein the elastomer reinforcement cord has a multi-strand structure including: at least one core strand formed by twisting plural metal filaments together; and two or more sheath strands each formed by twisting plural metal filaments together, the sheath strands being twisted together around the core strand, when, at a cross-section taken in a direction orthogonal to an axial direction after vulcanization, a region that is surrounded by a line connecting the centers of outermost-layer metal filaments of the respective sheath strands and occupied by other than the metal filaments is defined as an intra-sheath-strand gap region A, an intra-sheath-strand filling rate a, which is a ratio of the area of the polymer material with respect to the intra-sheath-strand gap region A, is 52% or higher, and when, at a cross-section taken in a direction orthogonal to the axial direction after vulcanization, a region between outermost-layer metal filaments of the core strand and the outermost-layer metal filaments of the sheath strands is defined as an inter-strand gap region B, an inter-strand filling rate b, which is a ratio of the area of the polymer material with respect to the inter-strand gap region B, is 75% or higher.

In the cord of the present invention, it is preferred that the polymer material have a melting point or softening point of 80° C. to 160° C. In the cord of the present invention, it is also preferred that the polymer material have a melt flow rate, which is defined by JIS K7210, of 1.0 g/10 min or higher.

Further, in the cord of the present invention, it is preferred that a distance between the outermost-layer metal filaments of the sheath strands be 20 μm or less.

Still further, in the cord of the present invention, it is preferred that the core strand and the sheath strands each have a layer-strand structure including a core and at least one sheath layer, and the core be formed by twisting three metal filaments together. Yet still further, the elastomer reinforcement cord of the present invention can be formed by twisting the metal filaments with resin filaments including the polymer material.

Effects of the Invention

According to the present invention, an elastomer reinforcement cord which has a multi-strand structure including plural metal filaments and exhibits an improved rust resistance can be realized.

MODE FOR CARRYING OUT THE INVENTION

Figure 1:
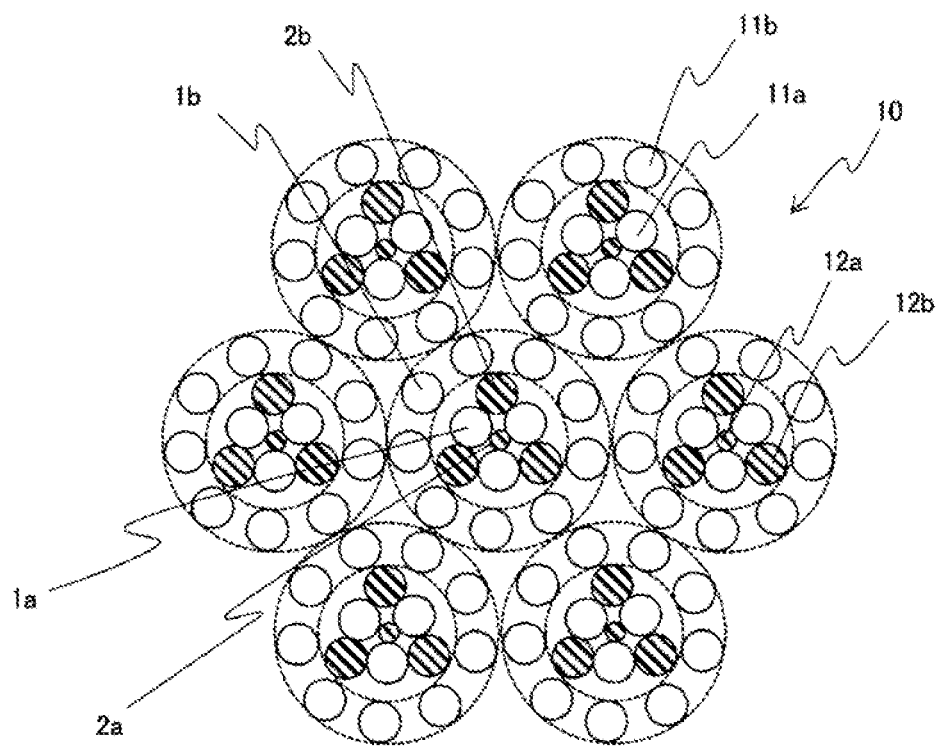
FIG. 1 is a cross-sectional view of an elastomer reinforcement cord according to one preferred embodiment of the present invention in a direction orthogonal to the axial direction before vulcanization.

The present invention will now be described in detail referring to the drawings.

FIG. 1 shows a cross-sectional view of an elastomer reinforcement cord according to one preferred embodiment of the present invention in a direction orthogonal to the axial direction before vulcanization. As illustrated, an elastomer reinforcement cord 10 of the present invention is formed by twisting metal filaments 1a, 1b, 11a and 11b with resin filaments 2a, 2b, 12a and 12b composed of a polymer material.

Figure 2:
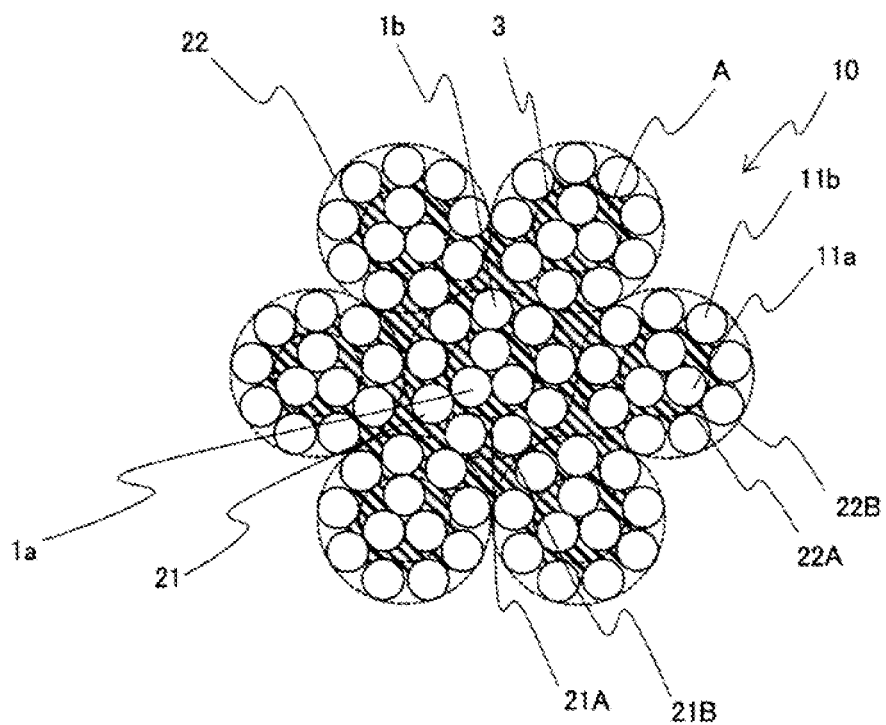
FIG. 2 is a cross-sectional view of the elastomer reinforcement cord shown in FIG. 1 in a direction orthogonal to the axial direction after vulcanization.

Further, FIG. 2 shows a cross-sectional view of the elastomer reinforcement cord shown in FIG. 1 in a direction orthogonal to the axial direction after vulcanization. As illustrated, the elastomer reinforcement cord 10 of the present invention has a multi-strand structure including: at least one core strand 21 formed by twisting plural metal filaments 1a and 1b together; and two or more sheath strands 22 each formed by twisting plural metal filaments 11a and 11b together, the sheath strands 22 being twisted together around the core strand 21.

Specifically, the illustrated elastomer reinforcement cord 10 includes: a single core strand 21 having a core 21A composed of three metal filaments 1a, and a single sheath layer 21B composed of nine metal filaments 1b; and six sheath strands 22, each having a core 22A composed of three metal filaments 11a, and a single sheath layer 22B composed of nine metal filaments 11b. However, the structure of the cord of the present invention is not restricted to the above-described structure.

Figure 3:
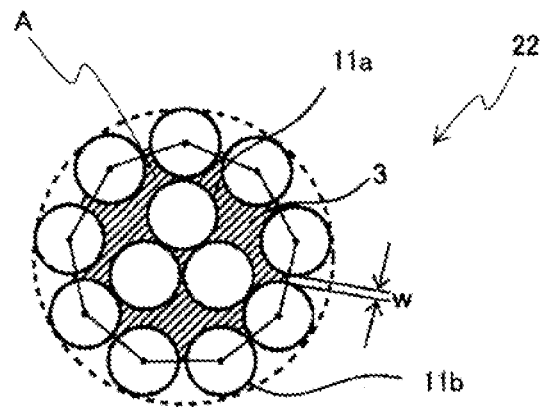
FIG. 3 is an enlarged view of a sheath strand extracted from FIG. 2.

FIG. 3 shows an enlarged view of one sheath strand 22 extracted from FIG. 2. In the cord 10 of the present invention, as illustrated, at a cross-section taken in a direction orthogonal to the axial direction after vulcanization, a region that is surrounded by a line connecting the centers of the outermost-layer metal filaments of the respective sheath strands 22 (a line connecting the centers of the metal filaments 11b constituting the sheath layer 22B in the illustrated example) and occupied by other than the metal filaments 11a and 11b is defined as an intra-sheath-strand gap region A. In the present invention, an intra-sheath-strand filling rate a, which is a ratio of the area of a polymer material 3 originated from the resin filaments with respect to the intra-sheath-strand gap region A, is 52% or higher.

Figure 4:
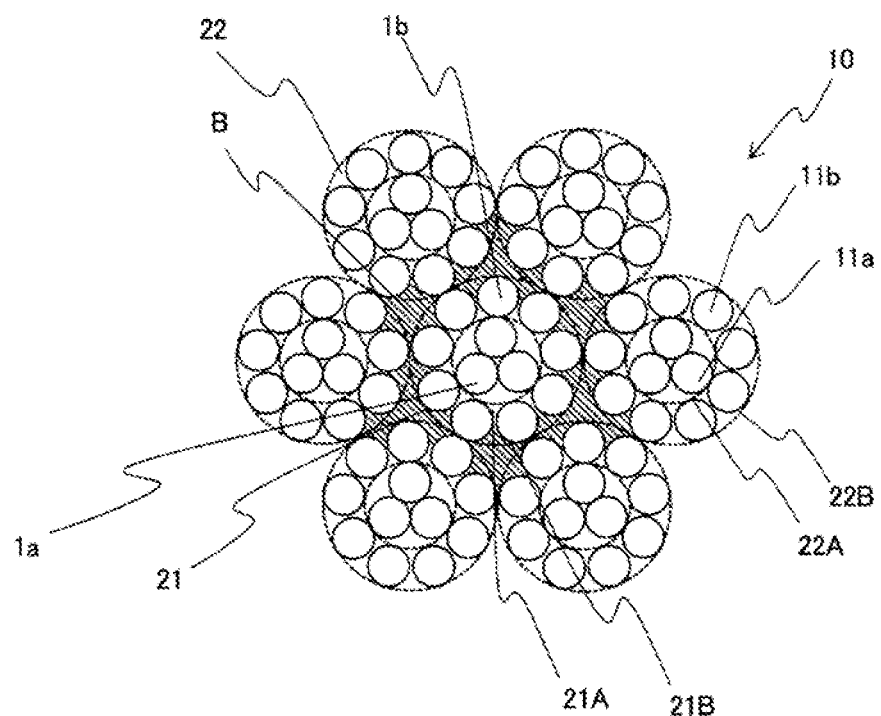
FIG. 4 is a drawing illustrating the inter-strand gap region B.

Further, in the present invention, as shown in FIG. 4 with diagonal lines, at a cross-section taken in a direction orthogonal to the axial direction after vulcanization, a region between the outermost-layer metal filaments of the core strand 21 (the metal filaments 1b constituting the sheath layer 21B in the illustrated example) and the outermost-layer metal filaments of the sheath strands 22 (the metal filaments 11b constituting the sheath layers 22B in the illustrated example) is defined as an inter-strand gap region B. In the present invention, an inter-strand filling rate b, which is a ratio of the area of the polymer material 3 originated from the resin filaments with respect to the inter-strand gap region B, is 75% or higher.

In the cord 10 of the present invention, by defining the filling ratios of the polymer material 3 in the regions occupied by other than the metal filaments in each sheath strand 22 and between the core strand 21 and the sheath strands 22 as the intra-sheath-strand filling rate a and the inter-strand filling rate b in the above-described manner, respectively, good rust resistance can be ensured even when the cord 10 has a multi-strand structure. When the intra-sheath-strand filling rate a is 52% or higher and the inter-strand filling rate b is 75% or higher, sufficient rust resistance is obtained since the gaps in the cord are sufficiently filled with the polymer material 3. It is noted here that, in the present invention, an intra-sheath-strand filling rate a of higher than 100% means that even the outer side of each intra-sheath-strand gap region A is filled with the polymer material 3, i.e. those parts of the surfaces of the outermost-layer metal filaments 11b of each sheath strand 22 that correspond to the cord outer periphery are covered with the polymer material 3. In the present invention, it is preferred that 50% or more of the surface area of the outermost-layer metal filaments of each sheath strand be in a state of being in contact with an elastomer.

In the present invention, the intra-sheath-strand filling rate a is required to be 52% or higher, and it is preferably 80% or higher, but preferably 130% or lower, more preferably 125% or lower. Further, the inter-strand filling rate b is required to be 75% or higher, and it is preferably 80% or higher, but preferably 110% or lower. It is noted here that, in the present invention, the intra-sheath-strand filling rate a is determined as an average value of at least two sheath strands.

In the present invention, the filling ratio of the polymer material 3 with respect to the gap region in the core strand 21 is not particularly restricted; however, it has been confirmed by the present inventor that, when the above-described conditions of the intra-sheath-strand filling rate a and the inter-strand filling rate b are satisfied, the polymer material 3 is also filled into the gap region in the core strand 21 at a rate of substantially 100%. This is believed to mean that, when the resin filaments are used in such an amount that satisfies the above-described conditions of the intra-sheath-strand filling rate a and the inter-strand filling rate b, the polymer material 3 melted or softened by heating during vulcanization is made to flow by the pressure applied during vulcanization and to thereby certainly fill the gap region in the core strand 21. Therefore, in the present invention, even when no resin filament is contained in the core strand 21 before vulcanization, the cord 10 having excellent rust resistance, in which the polymer material 3 is filled into the gap region in the core strand 21 at a rate of substantially 100% after vulcanization, can be obtained.

Further, in the cord 10 of the present invention, a distance w between the outermost-layer metal filaments 11b of the respective sheath strands 22 after vulcanization is preferably 100 μm or less. By this, the area in which the polymer material 3 originated from the resin filaments comes in contact with an elastomer such as rubber after vulcanization can be reduced. As a result, a reduction in the adhesive strength between the cord 10 and the elastomer can be inhibited; therefore, the durability of a product is not deteriorated. The distance w between the metal filaments 11b constituting the outermost sheath layer is preferably 20 μm or less.

Moreover, in the cord 10 of the present invention, it is preferred that, when cross-sections orthogonal to the axial direction are observed at intervals of 2 mm along the axial direction over a range of twice the twist pitch of the outermost sheath layers of the sheath strands 22, voids on the adjacent observed cross-sections be not in communication with each other at three or more spots. In other words, it is preferred that no void be continuous over a length of 6 mm or greater along the cord axial direction in the intra-sheath-strand gap region A. When a void is continuous in the intra-sheath-strand gap region A, the void acts as a water pathway and rust is developed on the metal filaments 11a and 11b. However, in the above-described state, closed systems are formed in the intra-sheath-strand gap region A, so that rust development along the axial direction can be effectively inhibited.

As the metal filaments 1a, 1b, 11 a and 11b in the cord 10 of the present invention, generally, metal wires containing steel, namely iron, as a main component (the mass of the iron is greater than 50% by mass with respect to a total mass of the metal filaments) can be used. The metal filaments 1a, 1b, 11a and 11b may consist of only iron, or may contain a metal other than iron, such as zinc, copper, aluminum, or tin. Particularly, steel filaments are used.

In the cord 10 of the present invention, the surfaces of the metal filaments 1a, 1b, 11a and 11b may be treated by plating. The type of the plating is not particularly restricted, and examples thereof include zinc plating, copper plating, brass plating, bronze plating, and ternary alloy plating such as copper-zinc-cobalt plating. Thereamong, brass plating composed of copper and zinc is preferred since brass-plated metal filaments exhibit excellent adhesion with rubber. In the brass plating, the ratio of copper and zinc (copper:zinc) is usually 60:40 to 70:30 based on mass. The thickness of the resulting plated layer is generally 100 nm to 300 nm.

In the cord 10 of the present invention, the diameter, the tensile strength, and the cross-sectional shape of the metal filaments 1a, 1b, 11a and 11b are not particularly restricted, and may be appropriately selected as desired. For example, the diameter of the metal filaments 1a, 1b, 11a and 11b may be 0.10 mm to 0.60 mm, and it is preferably 0.12 mm to 0.50 mm. By controlling the diameter of the metal filaments 1a, 1b, 11a and 11b to be 0.10 mm or larger, an excessive reduction in the size of the voids inside the cord can be inhibited, and the strength necessary for stable production of resin filaments required for filling can be ensured. On the other hand, an increase in the diameter for the purpose of ensuring such strength poses a concern of adversely affecting the cord twisting properties; therefore, a tensile strength required for the metal filaments 1a, 1b, 11a and 11b can be obtained when the diameter of the metal filaments 1a, 1b, 11 a and 11b is 0.60 mm or less, and this is also advantageous from the standpoint of attaining both satisfactory strength and weight reduction.

In the cord 10 of the present invention, with regard to the polymer material 3 constituting the resin filaments 2a, 2b, 12a and 12b, the melting point when a resin component contained therein is composed of a single resin, or the softening point when the resin component is composed of a composition containing two or more resins, is preferably 80° C. to 160° C., more preferably 130° C. to 160° C. By using the polymer material 3 whose melting point or softening point satisfies this range, the polymer material 3 is melted or softened during vulcanization and thereby made to flow, so that the polymer material 3 can favorably fill the gaps between the metal filaments in the cord. An excessively high melting point or softening point of the polymer material 3 have effects of, for example, making the polymer material 3 unlikely to be melted or softened during vulcanization and deteriorating the molding workability. The term "melting point" used herein refers to a melting peak temperature determined by the heat flux differential scanning calorimetry prescribed in JIS K7121. Further, the term "softening point" used herein refers to a value measured by the softening point test method prescribed in JIS K7206 (1999).

In the present invention, as the polymer material 3, it is preferred to use a polymer material having a melt flow rate (MFR), which is defined by JIS K7210, of 1.0 g/10 min or higher. The use of a polymer material having an MFR of 1.0 g/10 min or higher as the polymer material 3 is preferred since, when the resin filaments 2a, 2b, 12a and 12b are melted or softened during vulcanization, the polymer material 3 inside the cord can be ensured to have sufficient fluidity and is thus sufficiently filled into the gaps between the metal filaments constituting the cord. The MFR of the polymer material is more preferably 5.0 g/10 min or higher but, for example, 20 g/10 min or lower.

As the resin component of the polymer material 3, specifically, for example, an ionomer or an acid-modified resin can be used, or any combination thereof may be used as well. Among acid-modified resins, a resin modified with an acid anhydride of dimer acid, maleic acid, itaconic acid or the like is preferred. By using a maleic acid-modified resin, the adhesion of the polymer material 3 with the metal filaments can be improved.

Examples of the maleic acid-modified resin include maleic anhydride-modified styrene-ethylene-butadiene-styrene block copolymers (SEBS), maleic acid-modified polyethylenes, maleic anhydride-modified ultralow-density polyethylenes, maleic anhydride-modified ethylene-butene-1 copolymers, maleic anhydride-modified ethylene-propylene copolymers, maleic anhydride-modified ethylene-octene, and maleic anhydride-modified propylene, among which a maleic anhydride-modified SEBS is particularly preferred. Specific examples of commercially available products thereof include: TUFTEC M1943, M1911 and M1913, which are manufactured by Asahi Kasei Corporation, as well as ADMER LB548, NF518, QF551, QF500 and QE060, HI-WAX 4051E, 4252E and 1105A, and TAFMER MH7010 and MH7020, which are manufactured by Mitsui Chemicals, Inc. These may be used singly, or in combination of two or more thereof.

The resin component of the polymer material 3 preferably contains an ionomer. By incorporating an ionomer into the polymer material 3, the surfaces of the resin filaments 2a, 2b, 12a and 12b are smoothened, so that not only the spinnability can be improved but also the lubricity of the resin filaments in a twisting machine can be improved. In cases where a combination of an acid-modified resin and an ionomer is used as the resin component of the polymer material 3, in order to obtain the effects of both of these materials in a balanced manner, the mass ratio of the acid-modified resin and the ionomer is preferably in a range of 1:9 to 9:1 and, taking into consideration the balance of various performance, it is more preferably in a range of 4:6 to 6:4.

Specific examples of the ionomer include: zinc ion-neutralized ionomers, such as HIMILAN 1554, HIMILAN 1557, HIMILAN 1650, HIMILAN 1652, HIMILAN 1702, HIMILAN 1706 and HIMILAN 1855, as well as sodium ion-neutralized ionomers, such as HIMILAN 1555, HIMILAN 1601, HIMILAN 1605, HIMILAN 1707, HIMILAN 1856 and AM7331, all of which are manufactured by Dow-Mitsui Polychemicals Co., Ltd.; and lithium ion-neutralized ionomers such as SURLYN 7930, and sodium ion-neutralized ionomers such as SURLYN 8120, which are manufactured by DuPont Co., Ltd. These ionomers may be used singly, or in combination of two or more thereof.

Examples of the resin component of the polymer material 3 further include: "NUCREL" Series and "ELVALOY" Series, which are manufactured by Dow-Mitsui Polychemicals Co., Ltd.; "MODIC" Series manufactured by Mitsubishi Chemical Corporation; "OREVAC" Series, "BONDINE" Series, and "LOTRYL" Series, which are manufactured by Arkema K. K.; "REXPEARL" Series manufactured by Japan Polyethylene Corporation; "ACRYFT" Series manufactured by Sumitomo Chemical Co., Ltd.; fluorine-based ionomers manufactured by Asahi Kasei Corporation; and ethylene-ethyl acrylate copolymers manufactured by NUC Corporation. These resin components may be used singly, or in combination of two or more thereof.

In the present invention, the polymer material 3 may also contain an inorganic filler. As described above, since the resin filaments 2a, 2b, 12a and 12b are required to be easily melted or softened at a vulcanization temperature, the melting point or softening point thereof is preferably 160° C. or lower. However, when the melting point or the softening point of the resin is low, the strength of the resin filaments 2a, 2b, 12a and 12b is reduced and, therefore, the resin filaments may be broken during twisting, which deteriorates the productivity. Accordingly, in the cord 10 of the present invention, the strength of the resin filaments 2a, 2b, 12a and 12b may be improved by adding an inorganic filler to the polymer material 3. By adding an inorganic filler to the polymer material 3, the surface tackiness of the resin filaments 2a, 2b, 12a and 12b is reduced, so that the lubricity of the resin filaments 2a, 2b, 12a and 12b is further improved, which makes twisting of the cord easier.

The amount of the inorganic filler to be added is preferably 0.1 parts by mass to 30 parts by mass, more preferably 0.5 parts by mass to 30 parts by mass, still more preferably 5 parts by mass to 30 parts by mass, particularly preferably 10 parts by mass to 20 parts by mass, with respect to 100 parts by mass of the resin component contained in the polymer material 3. When the amount of the inorganic filler is 0.1 parts by mass or larger with respect to 100 parts by mass of the resin component, the effect of reinforcing the resin filaments 2a, 2b, 12a and 12b is sufficiently obtained. Meanwhile, by controlling the amount of the inorganic filler to be 30 parts by mass or less, not only saturation of the effect of reinforcing the resin filaments 2a, 2b, 12a and 12b is inhibited, which is preferred from the cost standpoint as well, but also sufficient dispersibility of the inorganic filler can be ensured and the durability of the resin filaments 2a, 2b, 12a and 12b can be improved at the same time.

Examples of the inorganic filler include carbon black, silica, aluminum hydroxide, clay, alumina, talc, mica, kaolin, glass balloons, glass beads, calcium carbonate, magnesium carbonate, magnesium hydroxide, magnesium oxide, titanium oxide, potassium titanate, and barium sulfate. These inorganic fillers may be used singly, or in combination of two or more thereof. Thereamong, carbon black is preferred from the standpoint of reinforcing the resin filaments 2a, 2b, 12a and 12b. It is noted here that rubber compositions constituting tires usually contain carbon black. Accordingly, when the cord 10 of the present invention is applied to a tire, the use of carbon black in the resin filaments 2a, 2b, 12a and 12b according to the cord 10 of the present invention improves the compatibility between the resin filaments 2a, 2b, 12a and 12b and a rubber composition constituting the tire; therefore, the adhesion between rubber and the polymer material is expected to be improved as well.

When carbon black is used, the grade thereof is not particularly restricted, and any carbon black may be selected as appropriate. Examples thereof include SRF, GPF, FEF, HAF, ISAF, and SAF. Particularly, for example, FEF, HAF, ISAF and SAF, which have excellent bending resistance and fracture resistance, can be preferably used, and the carbon black has a nitrogen adsorption specific surface area $N_2SA$ (according to JIS K6217-2:2001) of preferably 30 to 150 $m^2/g$, more preferably 35 to 130 $m^2/g$.

The polymer material 3 may also contain a thermoplastic resin and/or a thermoplastic elastomer to such an extent that does not hinder the effects of the present invention. Further, a variety of additives, such as an age resistor, an oil, a plasticizer, a color former, and a weather resistant agent, may be incorporated (blended) into the polymer material 3.

The resin filaments 2a, 2b, 12a and 12b can be produced by a known method using the polymer material 3, and the production method is not particularly restricted. For example, the resin filaments 2a, 2b, 12a and 12b can be produced by kneading the resin component and the like constituting the polymer material 3, and subsequently drawing the resulting resin composition. Further, when an inorganic filler is added to the polymer material 3, a large amount of the inorganic filler is added to the resin component to produce a masterbatch in advance, and the resin filaments 2a, 2b, 12a and 12b can be produced by adding this masterbatch to the resin component to prepare a resin composition containing the inorganic filler in a prescribed amount, and subsequently drawing the thus obtained resin composition.

In the present invention, the resin filaments 2a, 2b, 12a and 12b preferably have a diameter of 0.1 mm or larger. By controlling the diameter of the resin filaments 2a, 2b, 12a and 12b to be 0.1 mm or larger, the resin filaments 2a, 2b, 12a and 12b are made unlikely to be broken when twisted together with the metal filaments 1a, 1b, 11a and 11b, and this makes it easier to produce a cord having a desired structure. An upper limit of the diameter of the resin filaments 2a, 2b, 12a and 12b is not particularly restricted, and can be set as appropriate such that the conditions of the intra-sheath-strand filling rate a and the inter-strand filling rate b after vulcanization are satisfied.

The structure of the cord 10 of the present invention is not particularly restricted as long as the cord 10 of the present invention has a multi-strand structure including at least one core strand 21 and two or more sheath strands 22 and in which the sheath strands 22 are twisted together around the core strand 21. The cord 10 of the present invention may have specifically, for example, a multi-strand structure in which core strand and sheath strands each having an (N+M) structure of (1+6), (2+6), (2+8), (3+8), (3+9) or the like, an (N+M+L) structure of (3+9+15), (1+6+11) or the like, or a compact structure of (1+6), (2+8), (3+9), (1+6+12) or the like, are further twisted together after vulcanization. In the present invention, the metal filaments constituting the respective strands may have the same diameter or different diameters, and the core strand and the sheath strands may have the same structure or different structures.

Among the above-described structures, particularly, a cord whose strands each have a layer-strand structure constituted by a core and at least one sheath layer and in which the core of each strand is formed by twisting three metal filaments together have a structure that is unlikely to allow an elastomer to permeate into the voids inside the core; however, in the present invention, by arranging the resin filaments 2a and 12a in the core as illustrated in FIG. 1, the void in the center of the core can be easily filled with the polymer material 3 after vulcanization. Therefore, the application of the present invention is particularly useful for such a cord having a structure in which the cores of the core strand and the sheath strands are each formed by twisting three metal filaments together.

The cord 10 of the present invention can be obtained by twisting the metal filaments 1a, 1b, 11a and 11b with the resin filaments 2a, 2b, 12a and 12b, subsequently bringing the resin filaments 2a, 2b, 12a and 12b into a flowable state by heating, and then filling the gaps between the metal filaments 1a, 1b, 11 a and 11b with the polymer material 3. With regard to the arrangement positions of the resin filaments at the time of twisting the metal filaments with the resin filaments, there is no particular restriction as long as the gaps between the metal filaments can be appropriately filled with the polymer material by heating and the conditions of the intra-sheath-strand filling rate a and the inter-strand filling rate b after vulcanization are satisfied.

Because of the improved strength of the resin filaments 2a, 2b, 12a and 12b, the cord 10 of the present invention can be produced by twisting the resin filaments 2a, 2b, 12a and 12b together simultaneously with ordinary cord twisting, using a twisting machine or the like that is generally used for the production of a tire steel cord. Therefore, there is no increase in the operation steps, and the productivity is not deteriorated. From the standpoint of inhibiting twist breakage caused by different materials of the metal filaments 1a, 1b, 11 a and 11b and the resin filaments 2a, 2b, 12a and 12b, it is preferred to use a resin material having the highest strength possible for the resin filaments 2a, 2b, 12a and 12b. Preferably, the resin material has a Rockwell hardness (H scale) of 30 to 150. When the Rockwell hardness is 150 or lower, plastic working of the resin filaments 2a, 2b, 12a and 12b can be performed easily, and the cord twisting properties are improved. The strength of the resin filaments 2a, 2b, 12a and 12b can be improved by increasing the draw ratio in the production of the resin filaments 2a, 2b, 12a and 12b. Further, the resin filaments 2a, 2b, 12a and 12b preferably have good lubricity in a twisting machine.

The cord 10 of the present invention exhibits excellent adhesion with an elastomer such as rubber and, therefore, can be preferably used in those parts where a steel cord-rubber complex is conventionally used. Particularly, the cord 10 of the present invention can be preferably used as a reinforcing material of a rubber article, such as a tire, a belt, or a hose. Specific examples of the tire include tires of passenger vehicles, and tires for trucks and buses. A part to which the cord 10 of the present invention is applied is also not particularly restricted, and the cord 10 of the present invention can be used as a carcass ply reinforcing material or a belt reinforcing material. In this case, the cord 10 of the present invention can be used only for local reinforcement of a portion of a tread. The cord 10 of the present invention can also be used only for local reinforcement of, for example, the vicinity of a tread end, the vicinity of the equatorial plane, the vicinity of groove bottom or, when other inclined belt layer or a circumferential cord layer is included, an end thereof.

The elastomer used for covering the cord 10 of the present invention is also not particularly restricted and, for example, any rubber that is conventionally used for coating a metal cord can be used. In addition, examples of an elastomer that can be preferably used include: diene-based rubbers and hydrogenation products thereof, such as natural rubbers (NR), isoprene rubbers (IR), epoxidized natural rubbers, styrene-butadiene rubbers (SBR), butadiene rubbers (BR, high-cis BR and low-cis BR), nitrile rubbers (NBR), hydrogenated NBRs, and hydrogenated SBRs; olefin-based rubbers, such as ethylene-propylene rubbers (EPDM and EPM), maleic acid-modified ethylene-propylene rubbers (M-EPM), butyl rubbers (IIR), copolymers of isobutylene and an aromatic vinyl or diene monomer, acrylic rubbers (ACM), and ionomers; halogen-containing rubbers, such as Br-IIR, Cl-IIR, brominated isobutylene-p-methylstyrene copolymers (Br-IPMS), chloroprene rubbers (CR), hydrin rubbers (CHR), chlorosulfonated polyethylene rubbers (CSM), chlorinated polyethylene rubbers (CM), and maleic acid-modified chlorinated polyethylene rubbers (M-CM); silicone rubbers, such as methyl vinyl silicone rubber, dimethyl silicone rubber, and methylphenyl vinyl silicone rubber; sulfur-containing rubbers, such as polysulfide rubbers; fluororubbers, such as vinylidene fluoride-based rubbers, fluorine-containing vinyl ether-based rubbers, tetrafluoroethylene-propylene-based rubbers, fluorine-containing silicone-based rubbers, and fluorine-containing phosphazene-based rubbers; and thermoplastic elastomers, such as styrene-based elastomers, olefin-based elastomers, ester-based elastomers, urethane-based elastomers, and polyamide-based elastomers. These elastomers may be used singly, or in combination of two or more thereof by mixing.

Examples

The present invention will now be described in more detail by way of Examples thereof.

An intermediate wire material of 1.86 mm in diameter was produced by drawing and patenting a piano wire rod having a diameter of 5.5 mm and a carbon content of 0.82% by mass, and this intermediate wire material was plated with copper and zinc and subsequently subjected to thermal diffusion to prepare a brass-plated intermediate wire material, which was drawn again to obtain steel filaments having various diameters. For resin filaments, a polymer material (softening point: 110° C.), which was obtained by mixing TUFTEC M1943 manufactured by Asahi Kasei Corporation (softening point: 39° C., MFR: 8 g/min (JIS K7210)) as a maleic anhydride-modified SEBS and HIMILAN 1702 manufactured by Dow-Mitsui Polychemicals Co., Ltd. (melting point: 90° C.) as an ionomer at a ratio of 8:2, was used.

Next, in accordance with the strand structure shown below, strands having a (3+9) structure in their steel parts were prepared using the above-obtained steel filaments and resin filaments, and the thus obtained strands were each used as a core strand or a sheath strand to obtain an unvulcanized cord of Example 1 having a multi-strand structure in which six sheath strands were twisted together around a single core strand. The diameter of the resin filaments was selected in accordance with the conditions shown in Table below. In addition, an unvulcanized cord of Comparative Example 1 was produced in the same manner in accordance with the strand structure shown below. Further, unvulcanized cords of Comparative Example 2 and Examples 2 to 4 were produced by modifying the diameter of the resin filaments in the cord structure of Example 1 such that the respective conditions shown in Table below were satisfied. In Conventional Example 1, Comparative Example 3 and Example 5, predictive values of the same evaluation items as in Example 1 and the like are determined for the cords having a structure conforming to the respective conditions shown in Table below.

(Example 1): $1r_1+3+3r_2+9\times0.34$ mm+$6\times(1r_3+3+3r_4+9\times0.34$ mm)

(Conventional Example 1): $1r_1+3+3r_2+9\times0.34$ mm (Comparative Example 1): $7\times(3+9\times0.34$ mm)

The cord of Example 1 was constituted by: a single core strand having a layer-strand structure (3+9 structure) in which three steel filaments and three resin filaments ($r_2$) constituting a core, and nine steel filaments constituting a sheath layer were arranged and twisted together around a single resin filament ($r_1$); and six sheath strands each having a layer-strand structure (3+9 structure) in which three steel filaments and three resin filaments ($r_4$) constituting a core, and nine steel filaments constituting a sheath layer were arranged and twisted together around a single resin filament ($r_3$) (see FIG. 1). Further, the cord of Conventional Example 1 had a layer-strand structure (3+9 structure) in which three steel filaments and three resin filaments ($r_2$) constituting a core, and nine steel filaments constituting a sheath layer were arranged and twisted together around a single resin filament ($r_1$). Moreover, the cord of Comparative Example 1 had a multi-strand structure in which seven strands were twisted together, the strands each having a layer-strand structure (3+9 structure) in which nine steel filaments constituting a sheath layer were arranged and twisted together around three steel filaments constituting a core.

The thus obtained unvulcanized cords were each coated with a coating rubber to produce cord-rubber complexes, and these complexes were vulcanized at 145° C. for 40 minutes with a pressure equivalent to the pressure applied during tire vulcanization being applied thereto, and the surface of a rubber-attached cord cut out from each of the thus vulcanized cord-rubber complexes was coated with a silicone sealant. After drying this cord, both ends thereof was cut to obtain a sample length of 100 mm, and one end of the cord was sealed with a resin, while the other end of the cord was immersed in a 5%-by-mass aqueous sodium hydroxide (NaOH) solution for 24 hours. Thereafter, the cord was taken out of the aqueous solution, and the liquid propagation length from the cord end was measured. This measurement was performed for 10 to 30 cords (N=10 to 30), and an average value thereof was determined.

The results thereof are shown in Table below along with the parameters determined from the cross-sectional area of each resin filament used, the cross-sectional area occupied by the polymer material in each cord after vulcanization, and the like. It is noted here that the cross-sectional area occupied by the polymer material in each cord after vulcanization was calculated using an image analysis software.

As shown in Table above, it was confirmed that, by satisfying the respective ranges of the intra-sheath-strand filling rate a and the inter-strand filling rate b according to the present invention, an elastomer reinforcement cord in which liquid propagation is inhibited and the rust resistance is improved can be obtained.

Meanwhile, the liquid propagated over the entire length of the cord in Comparative Example 2 where the inter-strand filling rate b was insufficient and the resin area ratio in the cord was 40%. By the cross-sectional observation of this cord after vulcanization, the starting point of the water flow was revealed to be the voids between the strands. In addition, when the cord was dissected after vulcanization, it was confirmed that the resin did not leak to the outside of the cord, and there was no problem in adhesion as a multi-strand cord. Furthermore, equivalent rust resistance was also obtained in the cord of Example 2 in which the core strand contained no resin filament. From these results, it was found that the heat and the pressure during vulcanization caused the polymer material constituting the resin filaments to flow from the inside of the sheath strands to the inside of the core strand.

DESCRIPTION OF SYMBOLS 1a, 1b, 11a, 11b: metal filament
2a, 2b, 12a, 12b: resin filament
3: polymer material
10: elastomer reinforcement cord
21: core strand
21A, 22A: core
22: sheath strand
21B, 22B: sheath layer
A: intra-sheath-strand gap region
B: inter-strand gap region

The invention claimed is:

1. An elastomer reinforcement cord, comprising metal filaments and a polymer material,

TABLE 1

| | Resin area ratio in core strand (%)[1] | Resin area ratio in sheath strands (%)[1] | Intra-sheath-strand filling rate a (%)[2] | Inter-strand filling rate b (%)[3] | Resin area ratio in cord (%)[4] | Liquid propagation length (mm) |
|---|---|---|---|---|---|---|
| Conventional Example 1 | 110 | — | 14.7 | — | 11 | 110 |
| Comparative Example 1 | — | — | — | — | 0 | 110 |
| Comparative Example 2 | 110 | 60 | 95.7 | 67.4 | 40 | 110 |
| Example 1 | 110 | 80 | 81.0 | 80.6 | 50 | 22 |
| Example 2 | 0[5] | 110 | 77.8 | 82.1 | 55 | 10 |
| Example 3 | 110 | 100 | 86.9 | 86.8 | 60 | 23 |
| Example 4 | 100 | 110 | 90.8 | 80.3 | 75 | 15 |
| Comparative Example 3 | 0[5] | 60 | 49.1 | 57.5 | 30 | 110 |
| Example 5 | 130 | 130 | 121.6 | 97.5 | 76.5 | 11 |

[1] The ratio of the area of the resin filaments with respect to the gap region in each strand, which is determined by the following equation: {(Total cross-sectional area of resin filaments used in each strand at cross-section orthogonal to axial direction before vulcanization)/(Cross-sectional area of region occupied by other than metal filaments existing in each strand at a cross-section orthogonal to axial direction after vulcanization)} × 100

[2] When, at a cross-section taken in a direction orthogonal to the axial direction after vulcanization, a region that is surrounded by a line connecting the centers of the outermost-layer metal filaments of the respective sheath strands and occupied by other than the metal filaments is defined as "intra-sheath-strand gap region A", this value indicates the ratio of the area of the polymer material originated from the resin filaments with respect to the intra-sheath-strand gap region A, which ratio is an average value of six sheath strands.

[3] When, at a cross-section taken in a direction orthogonal to the axial direction after vulcanization, a region between the outermost-layer metal filaments constituting the core strand and the outermost-layer metal filaments constituting the sheath strands is defined as "inter-strand gap region B", this value indicates the ratio of the area of the polymer material originated from the resin filaments with respect to the inter-strand gap region B.

[4] The ratio of the area of the resin filaments with respect to the gap region in the cord, which is determined by the following equation: {(Total cross-sectional area of resin filaments used in cord at a cross-section orthogonal to axial direction before vulcanization)/(Cross-sectional area of region (shaded part in FIG. 2) occupied by other than metal filaments existing in cord at a cross-section orthogonal to axial direction after vulcanization)} × 100

[5] This represents a case where no resin filament was contained in the core strand.

wherein
the elastomer reinforcement cord has a multi-strand structure including: at least one core strand formed by twisting plural metal filaments together; and two or more sheath strands each formed by twisting plural metal filaments together, the sheath strands being twisted together around the core strand,
when, at a cross-section taken in a direction orthogonal to an axial direction after vulcanization, a region that is surrounded by a line connecting the centers of outermost-layer metal filaments of the respective sheath strands and occupied by other than the metal filaments is defined as an intra-sheath-strand gap region A, an intra-sheath-strand filling rate a, which is a ratio of the area of the polymer material with respect to the intra-sheath-strand gap region A, is 52% or higher, and
when, at a cross-section taken in a direction orthogonal to the axial direction after vulcanization, a region between outermost-layer metal filaments of the core strand and the outermost-layer metal filaments of the sheath strands facing the outermost-layer metal filaments of the core strand is defined as an inter-strand gap region B, an inter-strand filling rate b, which is a ratio of the area of the polymer material with respect to the inter-strand gap region B, is 75% or higher, and
wherein a distance between the outermost-layer metal filaments of the sheath strands is 20 μm or less.

2. The elastomer reinforcement cord according to claim 1, wherein the polymer material has a melting point or softening point of 80° C. to 160° C.

3. The elastomer reinforcement cord according to claim 2, wherein the polymer material has a melt flow rate, which is defined by JIS K7210, of 1.0 g/10 min or higher.

4. The elastomer reinforcement cord according to claim 3, wherein
the core strand and the sheath strands each have a layer-strand structure including a core and at least one sheath layer, and
the core is formed by twisting three metal filaments together.

5. The elastomer reinforcement cord according to claim 3, which is formed by twisting the metal filaments with resin filaments including the polymer material.

6. The elastomer reinforcement cord according to claim 2, wherein
the core strand and the sheath strands each have a layer-strand structure including a core and at least one sheath layer, and
the core is formed by twisting three metal filaments together.

7. The elastomer reinforcement cord according to claim 2, which is formed by twisting the metal filaments with resin filaments including the polymer material.

8. The elastomer reinforcement cord according to claim 1, wherein the polymer material has a melt flow rate, which is defined by JIS K7210, of 1.0 g/10 min or higher.

9. The elastomer reinforcement cord according to claim 8, wherein
the core strand and the sheath strands each have a layer-strand structure including a core and at least one sheath layer, and
the core is formed by twisting three metal filaments together.

10. The elastomer reinforcement cord according to claim 8, which is formed by twisting the metal filaments with resin filaments including the polymer material.

11. The elastomer reinforcement cord according to claim 1, wherein
the core strand and the sheath strands each have a layer-strand structure including a core and at least one sheath layer, and
the core is formed by twisting three metal filaments together.

12. The elastomer reinforcement cord according to claim 11, which is formed by twisting the metal filaments with resin filaments including the polymer material.

13. The elastomer reinforcement cord according to claim 1, which is formed by twisting the metal filaments with resin filaments including the polymer material.

14. The elastomer reinforcement cord according to claim 1, wherein the polymer material comprises an ionomer and an acid-modified resin.

15. The elastomer reinforcement cord according to claim 1, wherein 50% or more of the surface area of the outermost-layer metal filaments of each sheath strand is in a state of being in contact with the elastomer.

* * * * *